US012327378B2

United States Patent
Case et al.

(10) Patent No.: US 12,327,378 B2
(45) Date of Patent: Jun. 10, 2025

(54) SELF-DETERMINED SHOT GEOMETRY FOR OPEN-CONFIGURATION PORTABLE X-RAY COMPUTED TOMOGRAPHY (CT)

(71) Applicant: The Aerospace Corporation, El Segundo, CA (US)

(72) Inventors: Joseph T. Case, Hawthorne, CA (US); Shant Kenderian, Pasadena, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 397 days.

(21) Appl. No.: 17/863,490

(22) Filed: Jul. 13, 2022

(65) Prior Publication Data
US 2024/0020881 A1 Jan. 18, 2024

(51) Int. Cl.
*G06K 9/00* (2022.01)
*G06T 7/80* (2017.01)
*G06T 11/00* (2006.01)

(52) U.S. Cl.
CPC .............. *G06T 7/80* (2017.01); *G06T 11/005* (2013.01); *G06T 2207/10081* (2013.01)

(58) Field of Classification Search
CPC .............................. G06T 11/006; G06T 7/80; G06T 2207/10081
See application file for complete search history.

(56) References Cited

U.S. PATENT DOCUMENTS 10,096,148 B1  10/2018 Case et al.
2016/0278724 A1*  9/2016 Papaioannou ......... A61B 6/102
2017/0164919 A1*  6/2017 Lavallee ............. A61B 6/4405
2019/0175131 A1*  6/2019 Duewer ................ A61B 6/025
2020/0078938 A1*  3/2020 Bradski ................ B25J 9/1697
2022/0042930 A1*  2/2022 Stiebeiner ............ G01N 23/046

OTHER PUBLICATIONS

Albiol, et al., "Geometrical Calibration of X-Ray Imaging with RGB Cameras for 3D Reconstruction", IEEE Transactions on Medical Imaging, vol. 35, No. 8, Aug. 2016.
Cheriet, et al., "Self-calibration of a biplane X-ray imaging system for an optimal three dimensional reconstruction", Computerized Medical Imaging and Graphics 23 (1999) 133-141.
Cho, et al., "Accurate technique for complete geometric calibration of cone-beam computed tomography systems", Med. Phys. 32 (4), Apr. 2005.

(Continued)

*Primary Examiner* — Gregory A Morse
*Assistant Examiner* — Owais Iqbal Memon
(74) *Attorney, Agent, or Firm* — LeonardPatel PC

(57) ABSTRACT

A method for self-determination of shot geometry for use in open-configuration portable x-ray computed tomography (CT) includes inputting one or more x-ray shot images into a computing system. The method also include determining, by the computing system, one or more shot geometries from the one or more inputted x-ray shot images. The method further includes reconstructing, by the computing system, a volume image from the one or more inputted x-ray shot images and the one or more shot geometries. The method also includes outputting, by the computing system, a reconstructed volume image.

21 Claims, 8 Drawing Sheets

(56) References Cited

OTHER PUBLICATIONS

Elble, et al., "GPU computing with Kaczmarz's and other iterative algorithms for linear systems", Parallel Comput. Jun. 1, 2010; 36(5-6): 215-231. doi:10.1016/j.parco.2009.12.003.

Ferrucci, et al., "Towards Geometrical Calibration of X-Ray Computed Tomography Systems—A Review", Meas. Sci. Technol. 26 (2015) 092003 (30pp).

Rougee, et al., "Geometrical Calibration for 3D X-Ray Imaging", Proceedings of SPIE, Medical Imaging 1993, 1993, Newport Beach, CA, United States.

Rougee, et al., "Geometrical Calibration of X-Ray Imaging Chains for Three-Dimensional Reconstruction", Computerized Medical Imaging and Graphics, vol. 17, Nos. 4/5, pp. 295-300, 1993.

Sato, et al., "Geometry Calibration between X-Ray Source and Detector for Tomosynthesis with a Portable X-Ray System", Int J Cars (2017) 12:707-717.

Schumann, et al, "X-Ray Image Calibration and its Application to Clinical Orthopedics", Medical Engineering & Physics 36 (2014) 968-974.

Sun, et al., "A Calibration Method for Misaligned Scanner Geometry in Cone-Beam Computed Tomography", NDT & E International, vol. 39, No. 6, pp. 499-513, Sep. 2006, doi: 10.1016/J.NDTEINT.2006.03.002.

Vollebregt, Edwin, "The Bound-Constrained Conjugate Gradient Method for Non-Negative Matrices", J. Optim Theory Appl (2014) 162:931-953.

Owais Iqbal Memon, "Non-Final Office Action", issued Apr. 10, 2025, U.S. Appl. No. 18/051,052.

* cited by examiner

700

800

SELF-DETERMINED SHOT GEOMETRY FOR OPEN-CONFIGURATION PORTABLE X-RAY COMPUTED TOMOGRAPHY (CT)

FIELD

The present invention relates to a technique for the self-determination of shot geometry specifically intended for use in open-configuration portable x-ray CT.

BACKGROUND

Geometric calibration for x-ray CT and tomosynthesis systems is known. These systems utilize large constellations of ball bearings or similar encased in rigid plastic structures. They solve for the shot geometry given a rotational axis of symmetry and exploit mechanical repeatability such that the reference constellation need not be in the scene for all x-ray shots. Conventional geometric calibration uses a minimum of 30 constellation points embedded in a large plastic cylinder or other rigid shape.

Unfortunately, none of the known geometric calibration techniques are suitable for portable x-ray CT such that the reference must remain in the scene of interest for x-ray shots that are not mechanically repeatable. Conventional CT systems use a prohibitively large reference constellation consisting of many points (over 30), which is acceptable for mechanically repeatable systems where the constellation is removed for typical use. However, such a large constellation would interfere with the inspection for portable x-ray CT since the reference constellation must remain in the scene of interest for the duration of acquiring x-ray shots. The closest conventional geometric calibration technique still uses a large cuboid reference constellation for one step of the geometric calibration and depends upon mechanical repeatability. The process for self-determining shot geometry for portable x-ray CT must use a constellation of only a few points, which unfortunately provides the largest error for conventional geometric calibration. This is caused by fewer constellation points increasing the sensitivity of the constellation point estimate from the x-ray shot.

Accordingly, an open-configuration portable x-ray CT with a self-determined shot geometry technique may be needed.

SUMMARY

Certain embodiments of the present invention may provide solutions to the problems and needs in the art that have not yet been fully identified, appreciated, or solved by current open configuration portable x-ray CT technology. For example, some embodiments of the present invention pertain to an open-configuration portable x-ray CT with a self-determined shot geometry technique.

In an embodiment, a method for self-determination of shot geometry for use in open-configuration portable x-ray computed tomography (CT) includes inputting one or more x-ray shot images into a computing system. The method also include determining, by the computing system, one or more shot geometries from the one or more inputted x-ray shot images. The method further includes reconstructing, by the computing system, a volume image from the one or more inputted x-ray shot images and the one or more shot geometries. The method also includes outputting, by the computing system, a reconstructed volume image.

In another embodiment, a non-transitory computer-readable medium includes a computer program. The computer program is configured to cause at least one processor to execute inputting one or more x-ray shot images into a computing system, and determining one or more shot geometries from the one or more inputted x-ray shot images. The computer program is further configured to cause at least one processor to execute reconstructing a volume image from the one or more inputted x-ray shot images and the one or more shot geometries, and outputting a reconstructed volume image.

In yet another embodiment, a system for self-determination of shot geometry for use in open-configuration portable x-ray computed tomography (CT). The system includes memory comprising a set of instructions and at least one processor. The set of instructions is configured to cause at least one processor to execute inputting one or more x-ray shot images into a computing system, and determining one or more shot geometries from the one or more inputted x-ray shot images. The set of instructions is further configured to cause at least one processor to execute reconstructing a volume image from the one or more inputted x-ray shot images and the one or more shot geometries, and outputting a reconstructed volume image.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
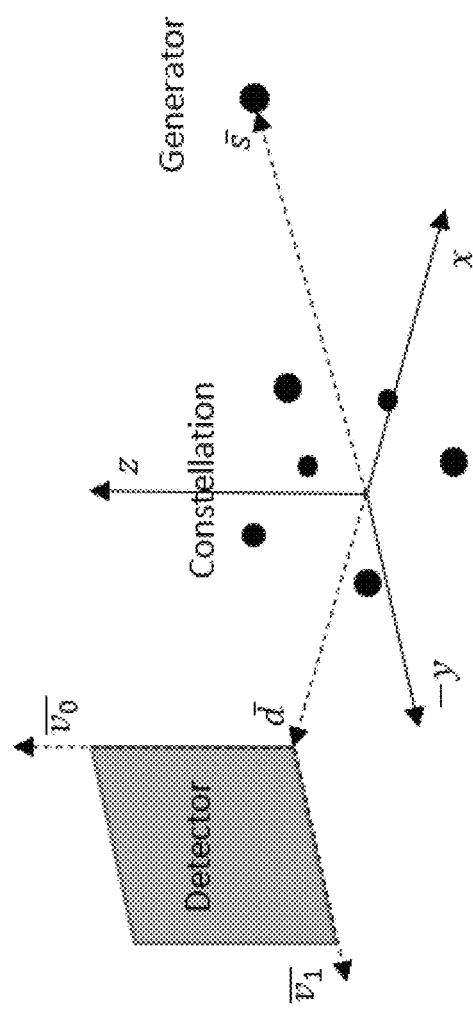
FIG. 1 is a diagram illustrating a shot geometry with constellation having 9 unknowns, according to an embodiment of the present invention.

Open-configuration portable x-ray CT enables the volumetric inspections of regions of interest on large parts. This technology uses algebraic reconstruction techniques (ART) for an arbitrary-shot cone-beam CT system. The open-configuration aspect of x-ray CT allows it to be portable and applicable to large and irregular parts that are not conducive to conventional booth setups or ring geometry.

Additionally, open-configuration portable x-ray CT allows for placing the x-ray generator and detector on opposite sides of a barrier (that is, ship hull or a wall) and inspections for regions of interest with limited access. However, volumetric reconstruction using CT requires that for every x-ray shot that the shot geometry must be known, which is unique for every shot. The shot geometry includes the x-ray generator position ($\bar{s}$) and x-ray flat panel digital detector position ($\bar{d}$) and orientation vectors ($\bar{v}_0$ and $\bar{v}_1$). See, for example, FIG. 1, which is a diagram 100 illustrating a shot geometry with constellation, according to an embodiment of the present invention. The system parameters will be introduced in detail in a following section; however, they may be represented as 9 system variables pertaining to shot geometry for every shot since the orientation vectors may be represented by rotations for roll, pitch, and yaw.

There are no previously published self-determined x-ray shot geometry technique that provides for sufficient geometric accuracy to be used for open-configuration portable x-ray CT. It should be noted that a known constellation must be used in every x-ray shot since open-configuration portable x-ray CT may be performed through a wall or barrier and there is no mechanical repeatability. This is made complicated by an engineering trade-off regarding the constellation size since large constellations provide superior geometric accuracy. However, the large constellations also interfere with the inspection of the region of interest.

Some embodiments may provide solutions to the challenges mentioned above. For example, some embodiments pertain to a technique for the self-determination of shot geometry specifically intended for use in open-configuration portable x-ray CT, and it is supported by experimental results. This technique is a customized geometric calculation technique, which uses a flat panel digital detector and a cone beam x-ray generator, where the placement of both is not mechanically repeatable. As mentioned before, self-determined shot geometry is meant to be strongly differentiated from the term geometric calibration, which is used for conventional CT systems since those are mechanically repeatable.

To determine the geometry for every shot, the geometry problem may be cast into an optimization problem to match projected marker centers to the x-ray image. The optimization process is used to minimize a cost function, such that the cost function would be proportional to the difference between the actual marker centers and the marker centers from an estimated geometry. Unfortunately, solving this optimization problem is made difficult since the cost function pertains to only one view angle—not many view angles like conventional CT systems. Consequently, optimizers tend to stall, providing inadequate results. To circumvent stalling, some embodiments split the optimization problem into multiple 7-unknown problems by exploiting the piercing point, where each world coordinate system uses a different marker location as its origin and may be solved for independently. The solution to every optimization result may then be merged to one global world coordinate system according to their fitness. This process is discussed in detail in the following sections.

The final step is to refine the shot geometry to its best estimate. The constellation markers may be imperfectly shaped or purposefully uniquely shaped for identification purposes. Thus, in some embodiments, a 3D model of the reference constellation for final optimization is reprojected. Results show that when this process is performed, the geometric error is satisfactorily low.

The following sections are described below—the shot geometry terms followed by the optimization problem of 9 unknowns. This is followed by breaking down the problem into multiple 7-unknown problems and describe how they are merged according to fitness. Next, the refinement process is described using a reprojection of the reference constellation.

Self-Determined Shot Geometry

In some embodiments, the technique determines the geometry of each x-ray shot from a known constellation. The constellation represents the coordinate system, and the coordinate system cannot be removed from the x-ray shot since open-configuration portable x-ray CT does not provide mechanical repeatability.

Additionally, the constellation cannot be large or consisting of a very large number of points since the constellation should not obscure the region of interest. These restrictions require solutions to ensure the proper determination of shot geometry. This process is described below in detail beginning with a description of the shot geometry followed by the rules to split the problem into sub-problems and merge.

Shot Geometry Description

As shown in FIG. 1, the x-ray shot geometry may be quantified by the generator position in Cartesian coordinates:

$$\bar{s} = (s_x, s_y, s_z), \quad (1)$$

the detector position in Cartesian coordinates $$\bar{d} = (d_x, d_y, d_z), \quad (2)$$

and the orthogonal detector orientation unit vectors $$\bar{v}_0 = (v_{0x}, v_{0y}, v_{0z}) \quad (3)$$

$$\bar{v}_1 = (v_{1x}, v_{1y}, v_{1z}) \quad (4)$$

$$\bar{v}_2 = (v_{2x}, v_{2y}, v_{2z}) = \bar{v}_0 \times \bar{v}_1. \quad (5)$$

Nine unknowns may be used to describe this geometry ($\bar{g}$): the generator position ($\bar{s}$), the detector position ($\bar{d}$), and the rotation angles for roll, pitch, and yaw ($r_x$, $r_y$, $r_z$), which makes $$\bar{g} = (s_x, s_y, s_z, d_x, d_y, d_z, r_x, r_y, r_z). \quad (6)$$

For this example, prior to applying the rotations, the default orientation vectors may be $$\bar{v}_0^0 = (0,0,1) \quad (7)$$

$$\bar{v}_1^0 = (0,-1,0) \quad (8)$$

$$\bar{v}_2^0 = (1,0,0) \quad (9)$$

as illustrated in FIG. 1. However, these vectors may change depending on the embodiments. For completeness, the rotation transformation matrices are defined as the following:

$$T_x = \begin{bmatrix} 1 & 0 & 0 \\ 0 & \cos(r_x) & -\sin(r_x) \\ 0 & \sin(r_x) & \cos(r_x) \end{bmatrix} \quad (10)$$

$$T_y = \begin{bmatrix} \cos(r_y) & 0 & \sin(r_y) \\ 0 & 1 & 0 \\ -\sin(r_y) & 0 & \cos(r_y) \end{bmatrix} \quad (11)$$

$$T_z = \begin{bmatrix} \cos(r_z) & -\sin(r_z) & 0 \\ \sin(r_z) & \cos(r_z) & 0 \\ 0 & 0 & 1 \end{bmatrix} \quad (12)$$

Consequently, the rotation transformation matrix may be applied to obtain some vector ($\overline{v_n}$) in order as $$\overline{v_n} = T\overline{v_n^0} = T_z T_y T_x \overline{v_n^0}. \quad (13)$$

Shot geometry $\overline{g}$ may be determined by forming an optimization problem to minimize a cost function. Since this optimization problem has 9 unknowns, it will hereafter be referred to as O9. In this example, let N be the number of constellation markers, and index $i \in 0 \ldots N-1$. Three-dimensional constellation points ($\overline{p}^i$) are related to the given projected constellation points ($\overline{q}^i$). Estimated projected points ($\overline{e}^i$) are determined from the geometry ($\overline{g}$) where:

$$\overline{e}^i = (e_0^i, e_1^i) \quad (14)$$

$$e_0^i = \overline{v_0} \cdot \left[ \overline{s} - \overline{d} + (\overline{p}^i - \overline{s}) \frac{\overline{v_2} \cdot (\overline{d} - \overline{s})}{\overline{v_2} \cdot (\overline{p}^i - \overline{s})} \right] \quad (15)$$

$$e_1^i = \overline{v_1} \cdot \left[ \overline{s} - \overline{d} + (\overline{p}^i - \overline{s}) \frac{\overline{v_2} \cdot (\overline{d} - \overline{s})}{\overline{v_2} \cdot (\overline{p}^i - \overline{s})} \right] \quad (16)$$

The nonlinear cost function may be described as the root mean square (RMS) of the projection error:

$$\text{cost}(\overline{g}) = \sqrt{\Sigma_{i=0}^{N-1} |\overline{e}^i(\overline{g}) - \overline{q}^i|^2} \quad (17)$$

Given an initial guess of the geometry, the optimizer iterates to minimize the cost function. Except where noted, some embodiments may use the Powell optimizer or any similar generic purpose optimization technique. As the technique iterates, the geometry is updated such that it results in an update in all N projected constellation points. The process repeats until the projection of the constellation points match those in the x-ray image. Unfortunately, as shown in the results, the O9 solution landscape for a small constellation is generally too difficult to solve reliably or results in a suboptimal solution; that is, a local minimum.

Splitting the Problem

Some embodiments utilize a technique to split the problem into multiple subproblems such that multiple optimization problems may be solved, compared, and merged according to their fitness. With these embodiments, it can be made highly unlikely that all subproblems should result in suboptimal solutions. Consequently, the splitting technique employed greatly aids in the search of the global optimum solution, which is unique to this technique.

Additionally, the problem may be split such that every subproblem has a uniquely selected constellation point as an anchor point. The role of the anchor point is to fix the projection of the anchor point as the optimizer iterates to minimize the cost function. Only the remaining N−1 projected constellation points change during the optimization process. The N subproblems are related to the original O9 problem through simple three-dimensional translations. Mathematically, the concept of the anchor point executes similarly to the piercing point such that it reduces the number of unknowns for every subproblem to 7 unknowns, hereafter referred to as O7 problems. Piercing point refers to the point on the detector that is the terminus for a ray passing from the x-ray source through the origin of the coordinate system.

Figure 2:
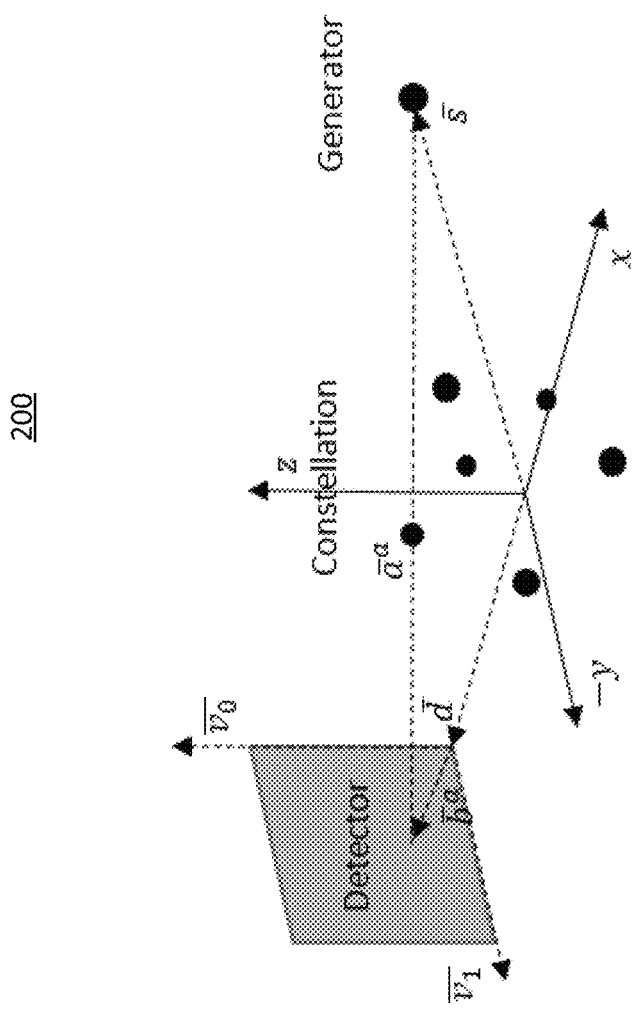
FIG. 2 is a diagram illustrating a shot geometry with constellation anchor having 7 unknowns, according to an embodiment of the present invention.

The geometry represented by every O7 problem is described below. Instead of world coordinates, a new coordinate system is translated by the selected anchor point ($\overline{\alpha}^\alpha$), which is different for every O7 problem, as shown in FIG. 2, where index $\alpha \in 0 \ldots N-1$. Thus, the new translated constellation points ($\overline{t}^i$) are $$\overline{t}^i = \overline{p}^i - \overline{\alpha}^\alpha. \quad (18)$$

The generator position relative to the anchor is:

$$\overline{s}^\alpha = (s_x^\alpha, s_y^\alpha, s_z^\alpha) = \overline{s} - \overline{\alpha}^\alpha. \quad (19)$$

The detector position relative to the anchor is:

$$\overline{d}^\alpha = (d_x^\alpha, d_y^\alpha, d_z^\alpha) = \overline{d} - \overline{\alpha}^\alpha. \quad (20)$$

The rotation angles for roll, pitch, and yaw ($r_x^\alpha, r_y^\alpha, r_z^\alpha$) remain the same since they result in directional unit vectors not affected by the translation. However, only the relative distance ($\alpha^\alpha$) between the generator and the detector along $\overline{v_2}$ is considered instead of anchor points ($d_x^\alpha, d_y^\alpha, d_z^\alpha$). To show this, the projection of the anchor point in detector coordinates ($\overline{b}^\alpha$), as shown in FIG. 2 is considered. Knowing that $\overline{b}^\alpha$ is determined by passing through the new origin, equations (15) and (16) are used to show that $$b_0^\alpha = \overline{v_0} \cdot \left[ \overline{s}^\alpha \left( \frac{\overline{v_2} \cdot \overline{d}^\alpha}{\overline{v_2} \cdot \overline{s}^\alpha} \right) - \overline{d}^\alpha \right] \quad (21)$$

$$b_1^\alpha = \overline{v_1} \cdot \left[ \overline{s}^\alpha \left( \frac{\overline{v_2} \cdot \overline{d}^\alpha}{\overline{v_2} \cdot \overline{s}^\alpha} \right) - \overline{d}^\alpha \right] \quad (22)$$

where $b_2^\alpha$ is 0 since $\overline{b}^\alpha$ lies in the plane of the detector. Let us also consider a new basis using orthogonal unit vectors $\overline{v_0}, \overline{v_1},$ and $\overline{v_2}$ such that $$\overline{s}^\alpha = (s_0^\alpha, s_1^\alpha, s_2^\alpha) \quad (23)$$

$$\overline{d}^\alpha = (d_0^\alpha, d_1^\alpha, d_2^\alpha) \quad (24)$$

Equations (21) and (22) are then simplified and derive the following relationships $$\alpha^\alpha = d_2^\alpha / s_2^\alpha \quad (25)$$

$$b_0^\alpha = \alpha^\alpha s_0^\alpha - d_0^\alpha \quad (26)$$

$$b_1^\alpha = \alpha^\alpha s_1^\alpha - d_1^\alpha \quad (27)$$

Consequently, seven unknowns may be used to describe the geometry for each subproblem ($\overline{h}^\alpha$):

$$\overline{h}^\alpha = (s_x^\alpha, s_y^\alpha, s_z^\alpha, \alpha^\alpha, r_x^\alpha, r_y^\alpha, r_z^\alpha), \quad (28)$$

Similar to before, a cost function may be defined for each subproblem:

$$\text{cost}(\overline{h}\alpha) = \Sigma_{i=0}^{N-1} |\overline{e}^i(\overline{h}^\alpha) - \overline{q}^i|^2 \quad (29)$$

where $\overline{e}^i$ is still determined from equations (15) and (16) after relating $\overline{h}^\alpha$ to an equivalent $\overline{g}$ using the relationships above. As mentioned before, this has the effect of fixing the projected anchor point and only moving the estimates of the remaining projected constellation points.

Merging Solutions

There are now N+1 total optimization problems each with their own solution: one O9 problem and N O7 subproblems. Whereas the O9 problem may stall, it is highly probable that one or more of the O7 problems succeed. All solutions estimate the global geometry after proper translation. Consequently, a singular weighted average solution to the geometry can be formed from the individual solution contributions. For ease of expressing the merge, let us designate $\bar{g}^\alpha$ as the global geometry as transformed from $\bar{h}^\alpha$. Let us also use the index $\alpha$ to now be $\alpha \in 0 \ldots N$ and assign the value of r to now be $\bar{g}$ from (6). Now there are N+1 geometries expressed by $\bar{g}^\alpha$. Given the individual optimal costs ($c^\alpha$), the weighted average can be expressed by dividing by the square of the cost:

$$\bar{w} = \sum_{a=0}^{N} \frac{\bar{g}^a}{(c^a)^2} / \sum_{a=0}^{N} \frac{1}{(c^a)^2} \quad (30)$$

This has the effect of favoring solutions with better fitness and penalizes solutions of lower fitness. The individual optimizers may be updated with the weighted average geometry and optimized repeatedly until termination criteria are met (e.g., maximum iteration, optimal cost, difference below tolerance, etc.).

Additionally, any of the solvers may diverge to a local minimum such that the generator or detector are far from the origin. A nonlinear penalty may be added to the cost functions for large distances.

Geometric Refinement

The work described prior to this section assumes the reduction of constellation markers to points. Unfortunately, inaccuracies are introduced by the imperfect estimation of marker centers from the x-ray shot. Additionally, imperfect spherical markers are used, which make the estimation of marker centers very difficult. Further still, the operator may have intentionally used markers with identifying features to allow for easier identification from the x-ray images. Therefore, a final refinement is performed using a reprojection of a 3D model of the reference constellation, which is the third and last unique feature of this technique.

The 3D model of the constellation may be represented by any number of techniques. For some embodiments, a 3D model is presented by partial voxel-based volumes, where each volume is represented by a cube consisting of square voxels of x-ray attenuation values.

The previous result of the shot geometry in global coordinates is $\bar{w}$ as defined in equation (30), and it may be used as an initial guess to determine a projection of the 3D model of the constellation (M). Given that the x-ray image is I, one may define a new cost function to solve for the final shot geometry $\bar{f}$ by summing over all pixels ($\rho$):

$$\text{cost}(\bar{f}) = \sqrt{\Sigma_\rho |M_\rho(\bar{f}) - I_\rho|^2} \quad (31)$$

The optimization problem must be performed with the same nine unknowns as described in equation (6); however, convergence is ensured since the initial guess $\bar{w}$ is a global optimum solution that satisfies all N+1 previously defined optimization problems.

The shot images and shot geometries may then be provided to the CT reconstruction algorithm. The CT reconstruction algorithm may then generate a volume image, where each voxel contains attenuation per unit volume. Subsequently, the volume image of the reference constellation may be subtracted from the generated volume image to produce a final volume image containing only the region of interest.

EXAMPLE EMBODIMENTS

As discussed above, systems for open-configuration portable x-ray CT use volume reconstruction, which requires x-ray shots. These x-ray shots must contain an x-ray image and shot geometry. The shot geometry includes a position of the x-ray source and the position/orientation of the x-ray detector. The problem with the systems for open-configuration portable x-ray CT is that the reconstruction is performed from arbitrary x-ray shots where the geometry may not be known.

Some embodiments of the present invention include a process for performing self-determined shot geometry. In some embodiments, the shot geometry is unknown and is determined from x-ray images of a rigid body. The rigid body includes a constellation of dense markers. These markers may be beads, which must be uniquely identified, or unique shapes for easy or automatic identification. In these embodiments, the markers are lead beads and their three dimensional (3D) positions are known with respect to one another.

Figure 3:
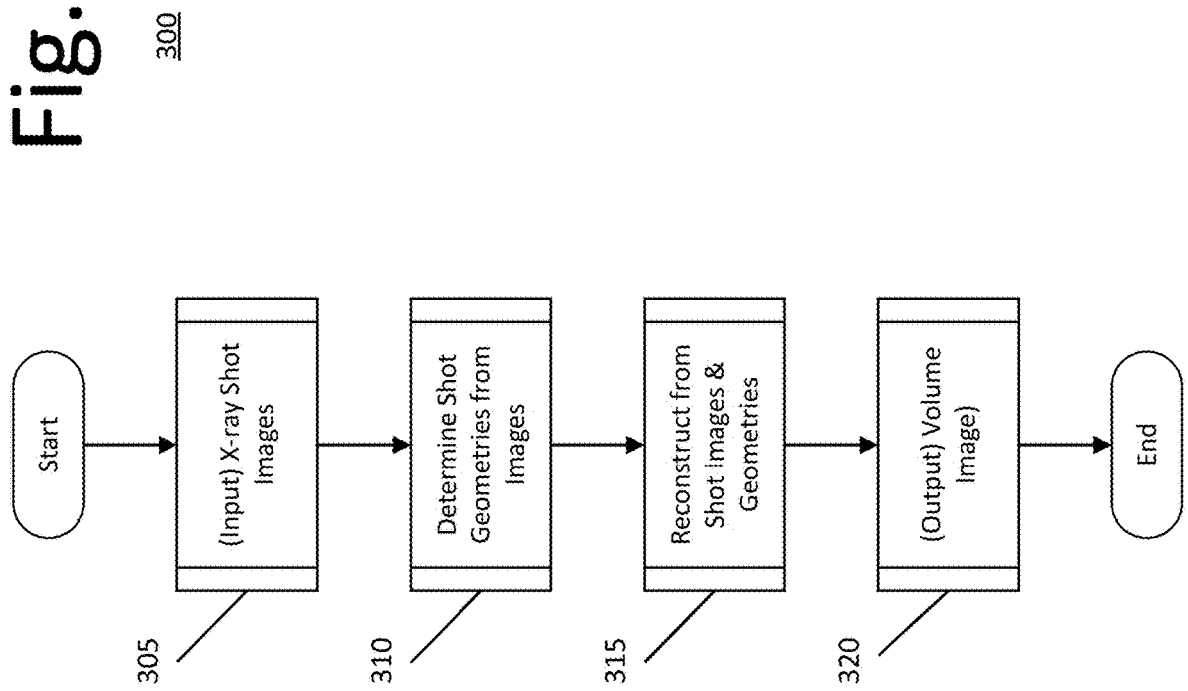
FIG. 3 is a flow diagram illustrating a process 300 for performing self-determined shot geometry, according to an embodiment of the present invention.
Figure 7:
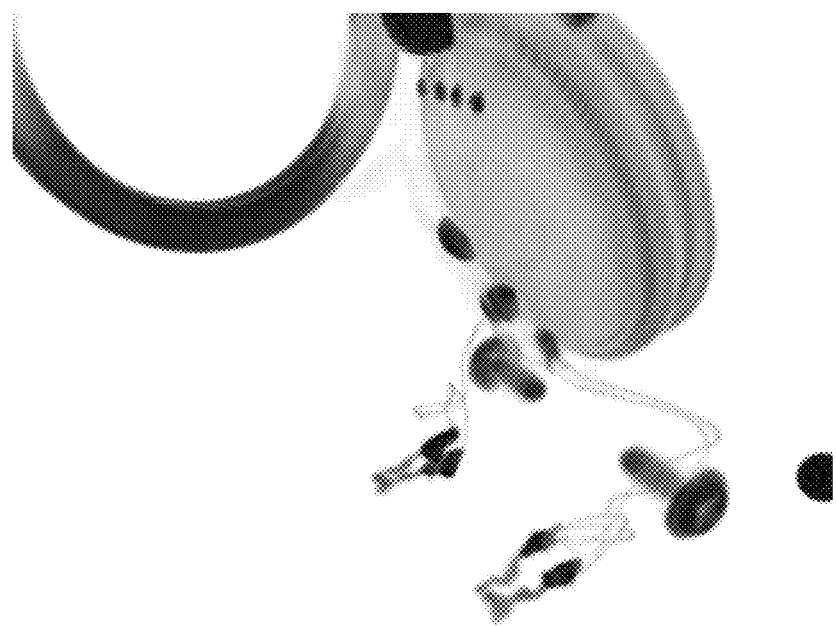
FIGS. 7 and 8 are images illustrating a reconstructed volume, according to an embodiment of the present invention.
Figure 8:
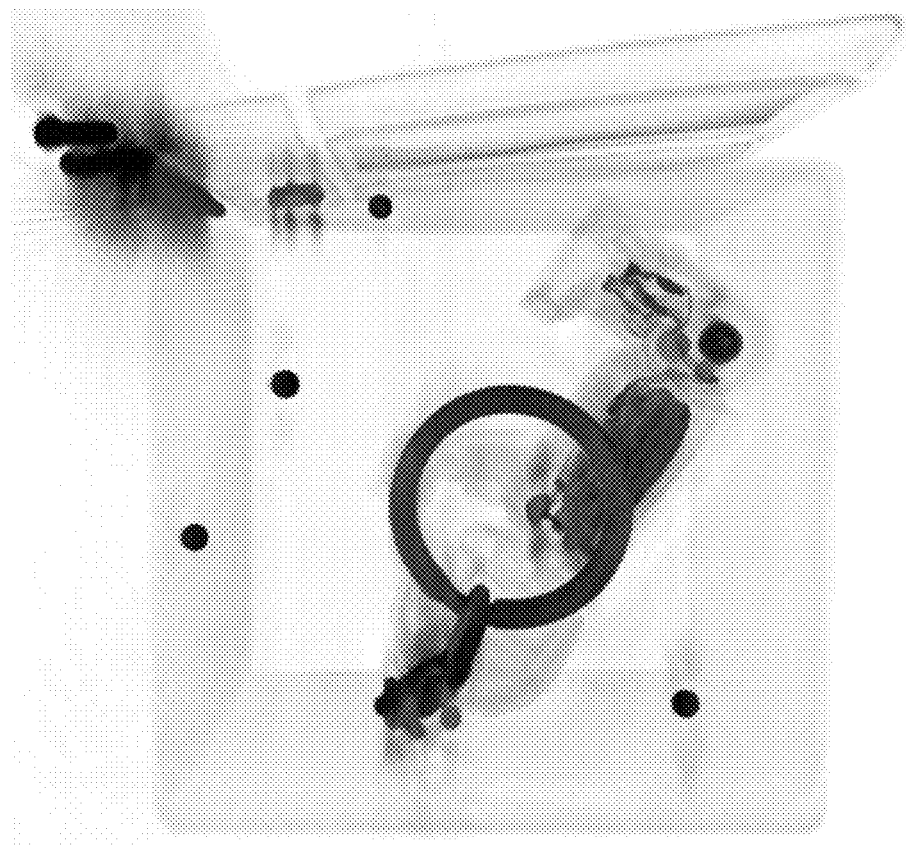

FIG. 3 is a flow diagram illustrating a process 300 for performing self-determined shot geometry, according to an embodiment of the present invention. In some embodiments, process 300 includes inputting one or more x-ray shot images (the "x-ray shot images") into a computing system at 305. At 310, process 300 includes determining shot geometries from the inputted x-ray shot images. For a more detailed explanation of step 310, see FIG. 4. Process 300 further includes reconstructing a volume image from the shot images and geometries at 315. The volume image contains values of attenuation per unit volume. At 320, process 300 includes outputting the reconstructed volume image. See, for example, FIGS. 7 and 8, which are images 700 and 800 illustrating a reconstructed volume, according to an embodiment of the present invention. In images 700 and 800, the scene of interest contains the reference constellation and the objects under test. The reference constellation is a collection of 6 markers of 2 mm diameter lead spheres glued to the inside of an open plastic box. There is one lead marker for the top, bottom, left, and right faces, and there are two lead markers for the front face. The objects under test include a keychain and stainless-steel Image Quality Indicator (IQI) with lead ASTM letters. The keychain contains a toy consisting of multiple materials like plastic, thin copper wires, lead solder joints, light-emitting diodes, battery, steel chain, ring, and small screws.

Figure 4:
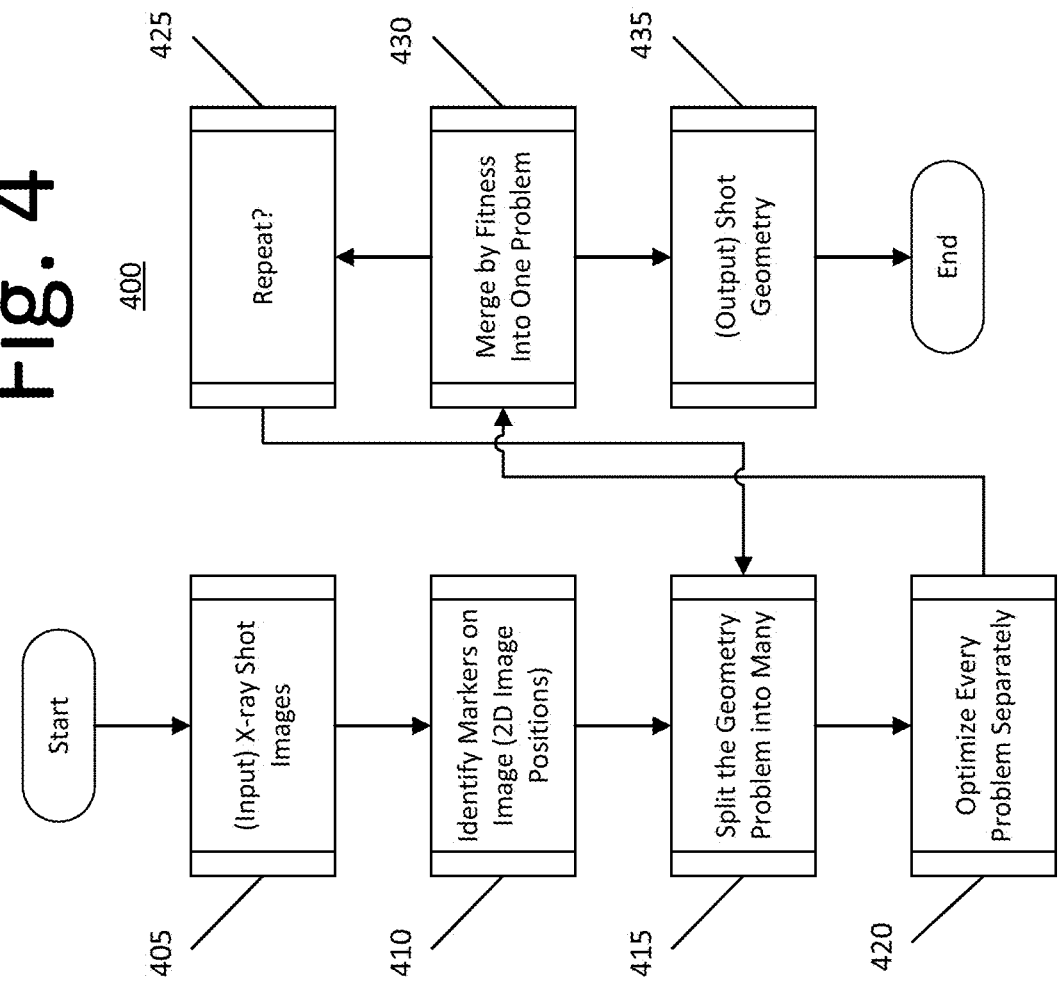
FIG. 4 is a flow diagram illustrating a process 400 for performing self-determined shot geometry from an image, according to an embodiment of the present invention.

FIG. 4 is a flow diagram illustrating a process 400 for performing self-determined shot geometry from an image, according to an embodiment of the present invention. In some embodiments, process 400 may be used in place of process 310. For example, process 400 includes inputting an x-ray shot image into a computing system at 405. At 410, process 400 includes identifying markers on the inputted x-ray shot image (e.g., 2D image positions), and at 415, splitting the geometry problem into many as described under the Splitting the Problem section.

At 420, process 400 also includes optimizing every problem separately, and at 430, merging by fitness into one problem. Fitness may be defined as inverse square of the cost, where the cost is the final cost as determined by the optimizer, as described above. At 425, the process checks to repeat steps 415 to 430 according to desired loop termination criteria; that is, maximum iteration or the cost from all optimizers are below a prescribed threshold. A more detailed explanation of this is provided in FIG. 4. At 435, process 400 includes outputting shot geometry to be used for reconstruction.

Figure 5:
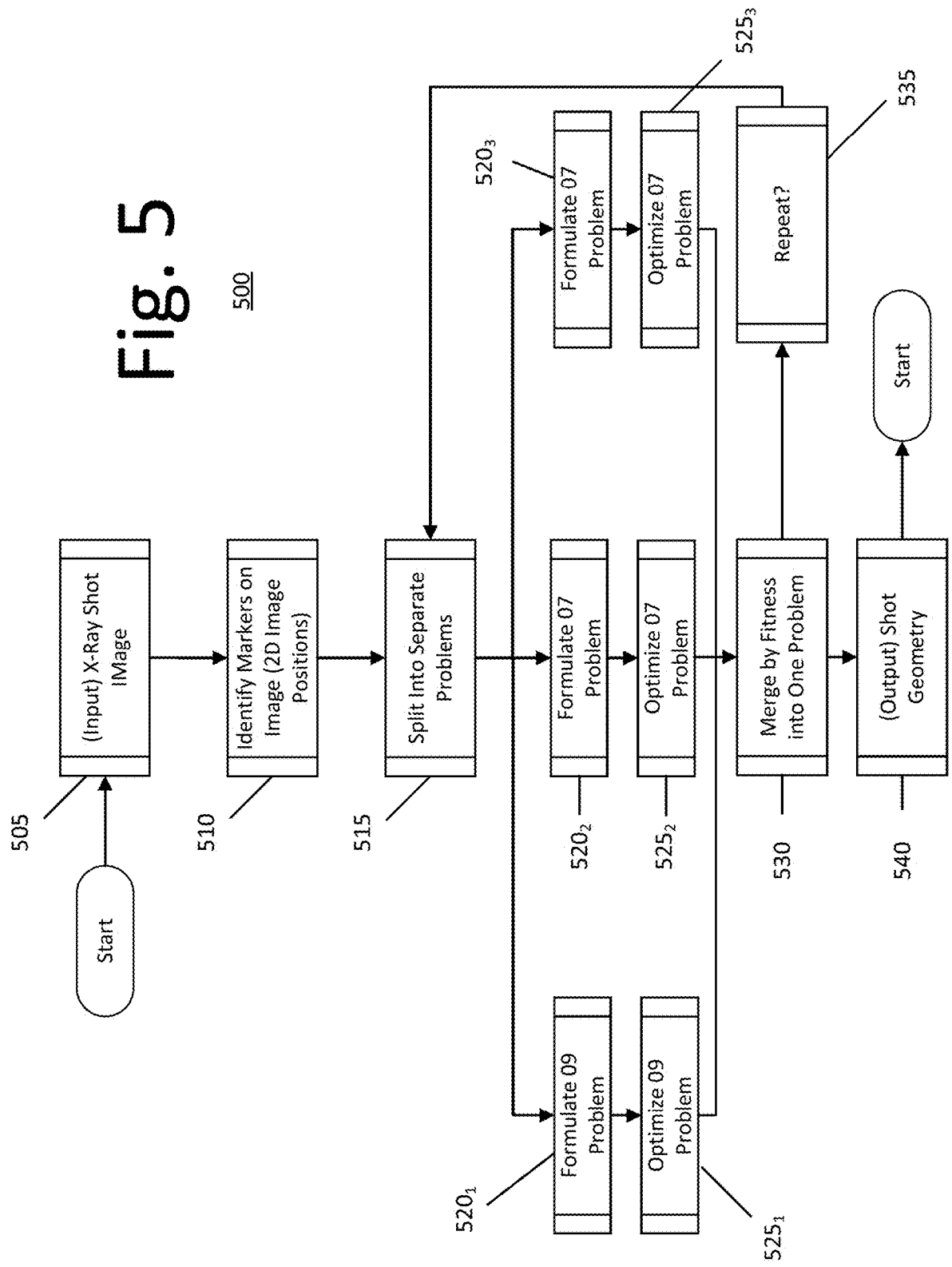
FIG. 5 is a flow diagram illustrating a process 500 for performing self-determined shot geometry from an image, according to an embodiment of the present invention.

FIG. 5 is a flow diagram illustrating a process 500 for performing self-determined shot geometry from an image, according to an embodiment of the present invention. In some embodiments, process 500 may be used in place of process 310. For example, process 500 includes inputting an x-ray shot image into a computing system at 505, and identifying markers on an inputted x-ray shot image into a computing system at 510. At 515, process 500 includes splitting the geometry problem into separate subproblems. More specifically, there is one O9 problem and N O7 problems, with each having their own anchor point. At $520_1 \ldots 520_3$, the separate problems are fully formulated. At $525_1 \ldots 525_3$, the optimization process is performed independently for each subproblem.

At 530, process 500 includes merging by fitness into one problem, and at 535, process 500 includes a check to repeat steps 515 to 530 according to the desired loop termination criteria; otherwise, at 540, shot geometry is outputted.

Figure 6:
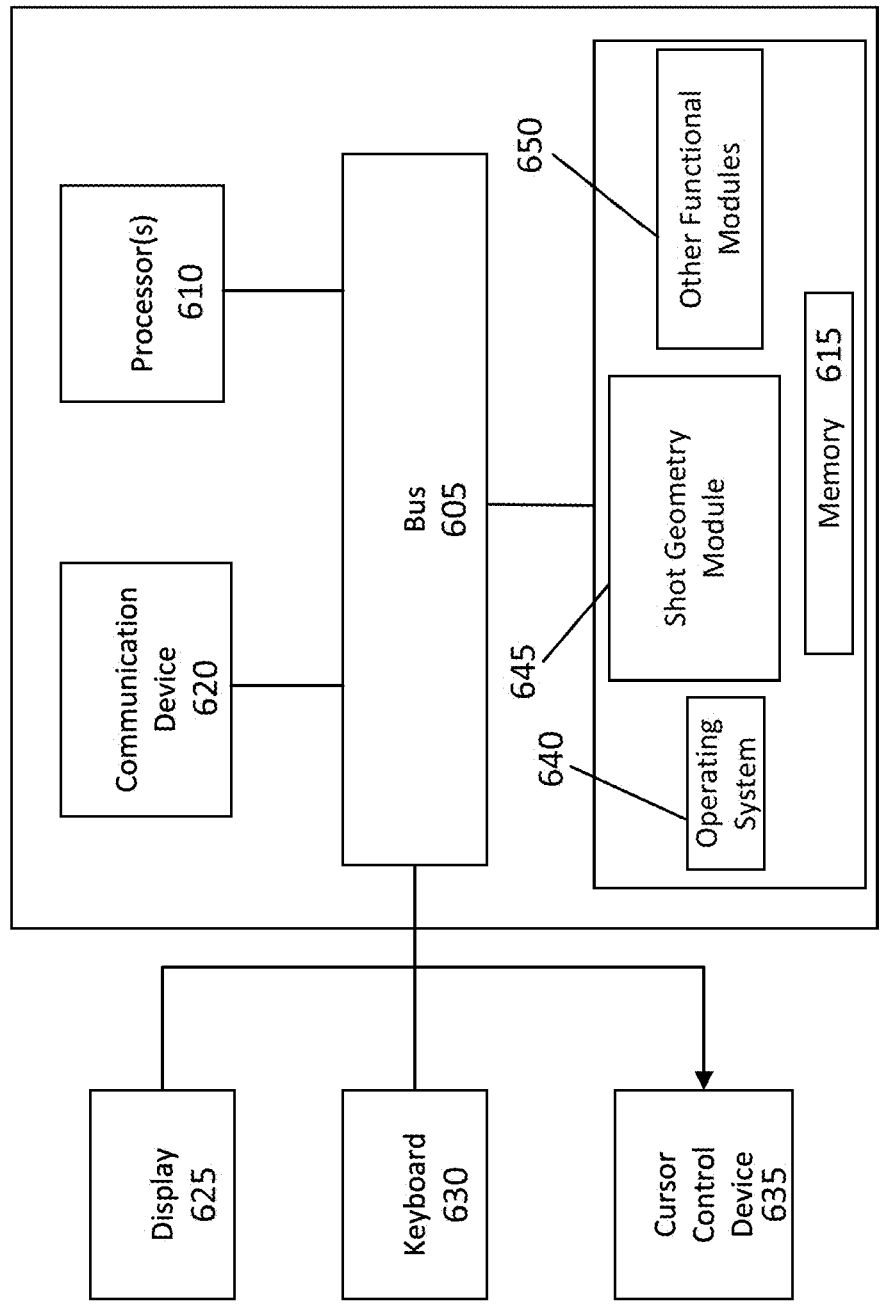
FIG. 6 is an architectural diagram illustrating a computing system configured to perform self-determined shot geometry, according to an embodiment of the present invention.

FIG. 6 is an architectural diagram illustrating a computing system 500 configured to perform self-determined shot geometry, according to an embodiment of the present invention. In some embodiments, computing system 600 may be one or more of the computing systems depicted and/or described herein. Computing system 600 includes a bus 605 or other communication mechanism for communicating information, and processor(s) 610 coupled to bus 605 for processing information. Processor(s) 610 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 610 may also have multiple processing cores, and at least some of the cores may be configured to perform specific functions. Multi-parallel processing may be used in some embodiments. In certain embodiments, at least one of processor(s) 610 may be a neuromorphic circuit that includes processing elements that mimic biological neurons. In some embodiments, neuromorphic circuits may not require the typical components of a Von Neumann computing architecture.

Computing system 600 further includes a memory 615 for storing information and instructions to be executed by processor(s) 610. Memory 615 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 610 and may include volatile media, non-volatile media, or both. The media may also be removable, non-removable, or both.

Additionally, computing system 600 includes a communication device 620, such as a transceiver, to provide access to a communications network via a wireless and/or wired connection. In some embodiments, communication device 620 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 620 may include one or more antennas that are singular, arrayed, phased, switched, beamforming, beam-steering, a combination thereof, and or any other antenna configuration without deviating from the scope of the invention.

Processor(s) 610 are further coupled via bus 605 to a display 625, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 625 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 630 and a cursor control device 635, such as a computer mouse, a touchpad, etc., are further coupled to bus 605 to enable a user to interface with computing system. However, in certain embodiments, a physical keyboard and mouse may not be present, and the user may interact with the device solely through display 625 and/or a touchpad (not shown). Any type and combination of input devices may be used as a matter of design choice. In certain embodiments, no physical input device and/or display is present. For instance, the user may interact with computing system 600 remotely via another computing system in communication therewith, or computing system 600 may operate autonomously.

Memory 615 stores software modules that provide functionality when executed by processor(s) 610. The modules include an operating system 640 for computing system 600. The modules further include a shot geometry module 645 that is configured to perform all or part of the processes described herein or derivatives thereof. Computing system 600 may include one or more additional functional modules 650 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 3-5 may be performed by a computer program, encoding instructions for the processor(s) to perform at least part of the process(es) described in FIGS. 3-5, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 610 of computing system 600 of FIG. 6) to implement all or part of the process steps described in FIGS. 3-5, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for self-determination of shot geometry for use in open-configuration portable x-ray computed tomography (CT), the method comprising:
   inputting, from a portable or movable x-ray generator and detector, one or more x-ray shot images into a computing system, wherein the placement of the portable or movable x-ray generator and detector is not mechanically repeatable;
   determining, by the computing system, one or more shot geometries with respect to a coordinate system, the coordinate system is defined by constellation of markers, the constellation of markers are identified from the one or more inputted x-ray shot images, the one or more inputted x-ray shot images are from the portable or movable x-ray generator and detector;
   reconstructing, by the computing system, a volume image from the one or more inputted x-ray shot images and the one or more shot geometries; and
   outputting, by the computing system, a reconstructed volume image.

2. The computer-implemented method of claim 1, wherein the determining the one or more shot geometries comprise:
   identifying, by the computing system, one or more markers on the one or more inputted x-ray shot images;
   splitting, by the computing system, a geometry problem into a plurality of problems for optimization;
   optimizing, by the computing system, each of the plurality of problems separately; and
   merging by fitness each of the plurality of optimized problems into a single problem.

3. The computer-implemented method of claim 2, wherein the determining the one or more shot geometries comprise:
   splitting, by the computing system, the geometry problem into a plurality of separate sub-problems.

4. The computer-implemented method of claim 3, wherein, for each of the plurality of separate sub-problems, there is one O9 problem and N number of O7 problems, with each having their own anchor point, where N is less than or equal to the number of constellation markers.

5. The computer-implemented method of claim 4, wherein the anchor point is configured to reduce a number of unknowns for every subproblem to 7 unknowns.

6. The computer-implemented method of claim 3, wherein the one or more shot geometries comprise:
   formulating, by the computing system, each of the plurality of separate sub-problems; and
   independently optimizing, by the computing system, each of the plurality of separate sub-problems.

7. The computer-implemented method of claim 1, further comprising:
   subtracting a volume image of a reference constellation from a generated volume image to produce the reconstructed volume image containing a region of interest.

8. A non-transitory computer-readable medium comprising a computer program, the computer program is configured to cause at least one processor to execute:
   inputting, from a portable or movable x-ray generator and detector, one or more x-ray shot images into a computing system, wherein the placement of the portable or movable x-ray generator and detector is not mechanically repeatable;
   determining one or more shot geometries with respect to a coordinate system, the coordinate system is defined by constellation of markers, the constellation of markers are identified from the one or more inputted x-ray shot images, the one or more inputted x-ray shot images are from the portable or movable x-ray generator and detector;
   reconstructing a volume image from the one or more inputted x-ray shot images and the one or more shot geometries; and
   outputting a reconstructed volume image.

9. The non-transitory computer-readable medium of claim 8, wherein the computer program is further configured to cause at least one processor to execute:
   identifying one or more markers on the one or more inputted x-ray shot images;
   splitting a geometry problem into a plurality of problems for optimization;
   optimizing each of the plurality of problems separately; and
   merging by fitness each of the plurality of optimized problems into a single problem.

10. The non-transitory computer-readable medium of claim 9, wherein the computer program is further configured to cause at least one processor to execute:
    splitting the geometry problem into a plurality of separate sub-problems.

11. The non-transitory computer-readable medium of claim 10, wherein, for each of the plurality of separate sub-problems, there is one O9 problem and N number of O7 problems, with each having their own anchor point, where N is less than or equal to the number of constellation markers.

12. The non-transitory computer-readable medium of claim 11, wherein the anchor point is configured to reduce a number of unknowns for every subproblem to 7 unknowns.

13. The non-transitory computer-readable medium of claim 10, wherein the computer program is further configured to cause at least one processor to execute:
    formulating each of the plurality of separate sub-problems; and
    independently optimizing each of the plurality of separate sub-problems.

14. The non-transitory computer-readable medium of claim 8, wherein the computer program is further configured to cause at least one processor to execute:
    subtracting a volume image of a reference constellation from a generated volume image to produce the reconstructed volume image containing a region of interest.

15. A system for self-determination of shot geometry for use in open-configuration portable x-ray computed tomography (CT), the system comprising:
    memory comprising a set of instructions; and
    at least one processor, wherein
    the set of instructions is configured to cause at least one processor to execute
      inputting, from a portable or movable x-ray generator and detector, one or more x-ray shot images into a computing system, wherein the placement of the portable or movable x-ray generator and detector is not mechanically repeatable;
      determining one or more shot geometries with respect to a coordinate system, the coordinate system is defined by constellation of markers, the constellation of markers are identified from the one or more inputted x-ray shot images, the one or more inputted x-ray shot images are from the portable or movable x-ray generator and detector;
      reconstructing a volume image from the one or more inputted x-ray shot images and the one or more shot geometries; and
      outputting a reconstructed volume image.

16. The system of claim 15, wherein the set of instructions is further configured to cause at least one processor to execute:
    identifying, by the computing system, one or more markers on the one or more inputted x-ray shot images;
    splitting, by the computing system, a geometry problem into a plurality of problems for optimization;
    optimizing, by the computing system, each of the plurality of problems separately; and
    merging by fitness each of the plurality of optimized problems into a single problem.

17. The system of claim 16, wherein the set of instructions is further configured to cause at least one processor to execute:
    splitting, by the computing system, the geometry problem into a plurality of separate sub-problems.

18. The system of claim 17, wherein, for each of the plurality of separate sub-problems, there is one O9 problem and N number of O7 problems, with each having their own anchor point, where N is less than or equal to the number of constellation markers.

19. The system of claim 18, wherein the anchor point is configured to reduce a number of unknowns for every subproblem to 7 unknowns.

20. The system of claim 17, wherein the set of instructions is further configured to cause at least one processor to execute:
- formulating, by the computing system, each of the plurality of separate sub-problems; and
- independently optimizing, by the computing system, each of the plurality of separate sub-problems.

21. The system of claim 15, wherein the set of instructions is further configured to cause at least one processor to execute:
- subtracting a volume image of a reference constellation from a generated volume image to produce the reconstructed volume image containing a region of interest.

* * * * *